(12) United States Patent
Krofchalk

(10) Patent No.: US 6,697,455 B2
(45) Date of Patent: Feb. 24, 2004

(54) VOICE ACTIVATED DIALING APPARATUS

(76) Inventor: Gary F. Krofchalk, 3400 Lakeside Dr., Rockwall, TX (US) 75087

( * ) Notice: Subject to any disclaimer, the term of this patent is extended or adjusted under 35 U.S.C. 154(b) by 80 days.

(21) Appl. No.: 09/794,572

(22) Filed: Feb. 27, 2001

(65) Prior Publication Data
US 2002/0118801 A1 Aug. 29, 2002

(51) Int. Cl.[7] .......................... H04M 1/64; H04M 1/00
(52) U.S. Cl. ................... 379/88.03; 379/428.02
(58) Field of Search .................. 379/88.03, 88.01, 379/88.02, 69, 77, 80, 87, 428.04, 352, 428.02, 428.01, 355.01–355.09

(56) References Cited

U.S. PATENT DOCUMENTS

| | | | |
|---|---|---|---|
| 4,348,550 A | * 9/1982 | Pirz et al. | 379/355.06 |
| 4,593,157 A | * 6/1986 | Usdan | 379/88.01 |
| 4,644,107 A | 2/1987 | Clowes et al. | |
| 4,837,808 A | 6/1989 | Immendorfer et al. | |
| 4,853,953 A | 8/1989 | Fujisaki | |
| 4,882,750 A | * 11/1989 | Henderson et al. | 379/355.06 |
| 4,928,302 A | 5/1990 | Kaneuchi et al. | |
| 4,945,557 A | * 7/1990 | Kaneuchi et al. | 379/88.03 |
| 5,007,081 A | 4/1991 | Schmuckal et al. | |
| 5,042,063 A | 8/1991 | Sakanishi et al. | |
| 5,054,054 A | 10/1991 | Pessia et al. | |
| 5,111,501 A | * 5/1992 | Shimanuki | 379/355.06 |
| 5,182,765 A | * 1/1993 | Ishii et al. | 379/88.04 |
| 5,222,121 A | 6/1993 | Shimada | |
| 5,335,261 A | * 8/1994 | Fujinaka | 455/563 |
| 5,452,340 A | * 9/1995 | Engelbeck et al. | 379/88.03 |
| 5,455,859 A | * 10/1995 | Gutzmer | 379/442 |
| 5,483,579 A | 1/1996 | Stogel | |
| 5,594,784 A | * 1/1997 | Velius | 379/88.02 |
| 5,805,672 A | * 9/1998 | Barkat et al. | 379/88.03 |
| 6,198,947 B1 | * 3/2001 | Barber | 455/563 |
| 6,236,715 B1 | * 5/2001 | Wong | 379/88.03 |
| 6,377,663 B1 | * 4/2002 | Thurber | 379/88.03 |
| 6,393,304 B1 | * 5/2002 | Meche | 455/563 |

OTHER PUBLICATIONS

U.S. patent application Ser. No. US H1646, Kato et al., filed May 1997.*

* cited by examiner

Primary Examiner—Fan Tsang
Assistant Examiner—Joseph T Phan
(74) Attorney, Agent, or Firm—Conley Rose, P.C.

(57) ABSTRACT

A telephone having a voice activated dialing feature includes a base, a handset and a transmission line coupled therebetween. Also coupled to the transmission line at a location intermediate the base and handset is a voice recognition/voice tone generation (or "VR/VTG") circuit for detecting an audio signal originating at sound detection/generation (or "SD/G") circuitry located within the handset and generating, in response thereto, a series of tones for propagation along the transmission line. Telephone circuitry within the base detects the series of tones and establishes a call in response thereto. The VR/VTG circuit is located entirely within a housing having first and second connector plugs. A first link of the transmission line extends from the telephone circuitry to the first connector plug, a second link of the transmission line to which the VR/VTG circuit is coupled extends from the first connector plug to the second connector plug and is located entirely within the first housing, and a third link of the transmission line extends from the second connector plug to the SD/G circuitry. Upon detecting a dial tone on the second link of the transmission line, an electrical signal is generated for transmission to the handset where it is converted into an audible prompt. An audible sound uttered in response to the prompt is converted into a second electrical signal. If the audible sound is recognized by the VR/VTG circuit, a series of tones capable of causing telephone circuitry within the base to establish a call are generated 20 Claims, 6 Drawing Sheets

VOICE ACTIVATED DIALING APPARATUS

CROSS REFERENCE TO RELATED APPLICATION

This application is related to U.S. patent application Ser. No. 09/794,573, entitled "User Interface for Voice Activated Dialing Apparatus", filed on even date herewith, and hereby incorporated by reference is if reproduced in its entirety.

TECHNICAL FIELD

This specification relates generally to telephony systems and, more particularly, to a voice activated dialing system operably connectable between base and handset portions of a telephone.

BACKGROUND

Voice recognition is the technology by which sounds, words or phrases spoken by humans are converted into electrical signals which, in turn, are transformed into coding patterns to which meaning has been assigned. Applications of voice recognition technology have been developed for a wide array of devices, including, but not limited to, personal computers, telephony devices, home appliances and security systems. Many of the telephony devices which incorporate voice recognition technology are wireless communication devices intended for use in automotive and other operating environments where "hands-free" operation is desirable to enhance safe usage of the telephony device. See, for example, U.S. Pat. No. 5,042,063 to Sakanishi et al. and U.S. Pat. No. 5,222,121 to Shimada. Other telephony devices are designed for wireline communication networks such as the public switched telephone network (or "PSTN"). While these devices also retrieve and dial telephone numbers in response to a spoken word or phrase, unlike the safety concerns motivating the development of voice activated telephony devices for use in wireless networks, voice activated telephones for use in the PSTN or other wireline networks are often marketed as modem conveniences designed to improve worker efficiency by enhancing the speed at which telephone numbers may be retrieved from a personal directory and dialed.

The electronic circuitry necessary to retrieve and dial telephone numbers maintained in a memory or other storage device may either be incorporated into the telephone itself or into a discrete device coupled thereto. U.S. Pat. No. 4,644,107 to Clowes et al., U.S. Pat. No. 4,928,302 to Kaneuchi et al., U.S. Pat. No. 5,007,081 to Schmuckal et al. and U.S. Pat. No. 5,111,501 to Shimanuki all disclose telephones equipped with voice recognition circuitry which, upon detection of an appropriate audibilization, initiate dialing of a corresponding telephone number. Conversely, U.S. Pat. No. 4,837,808 to Immendorfer et al., U.S. Pat. No. 4,853,953 to Fujisaki and U.S. Pat. No. 5,483,579 to Stogel disclose voice recognition dialers which generate dialing sequences for transmission to wireline telephones variously coupled thereto. Regardless of their particular configuration, many voice activated dialing systems require substantial modifications to either the telephones themselves or to other portions of the telephony systems associated therewith, particularly when such systems involve multiple lines associated with each telephone.

One technique used by electronic devices to perform voice recognition is commonly referred to as "template matching." Template matching is generally considered the simplest voice recognition technique and also enjoys the highest accuracy when properly used. The user first speaks a word or phrase into a microphone. The electrical signal from the microphone is digitized by an analog-to-digital (or "A/D") converter and is stored in memory. To determine the meaning of the voice input, a processor attempts to match the voice input with a digitized voice sample, or template, stored in memory, that has a known meaning. Upon identifying a template which matches the word or phrase spoken by the user, the processor executes a function associated with the matching template. However, since every person's voice is different, electronic devices which use template matching to perform voice recognition must be trained with the voice input of a prospective user before that user's voice can be recognized by the electronic device. During such a training session, the user would repeatedly speak a selected words or phrases into the microphone. The processor computes a statistical average of the multiple samples for each one of the selected words or phrases and stores the averaged samples as templates in corresponding program data structures. Command or data information is then associated with the template. For example, when training a voice activated dialer, the spoken sample would be a name of a person and the command information associated with that sample would be a string of digits to be dialed upon detection of the name being spoken.

While the aforementioned training technique is satisfactory for use with many electronic devices, it is less readily accepted for use with voice activated dialers. In particular, retraining processes which involve the editing of the personal telephone directory maintained by voice activated dialers have proven particularly problematic. Once properly trained, most voice activated devices require little retraining. In contrast, however, personal telephone directories require frequent editing. Personal moves, purchases of wireless telephones, corporate relocations, employee turnover and establishment of new area codes are just some of the events which may necessitate the editing of a personal telephone directory maintained by a voice activated dialer. Unfortunately, few voice activated devices are designed for ease of use when editing. In particular, the partial editing of entries is oftentimes difficult. As previously set forth, training of a voice activated device involves the association of a spoken word or phrase and command or data information. For example, the training of a voice activated word processing application would involve associating a combination of keystrokes with a spoken word. Designers have long recognized that, once trained, a voice activated electronic device may often require editing so that a new audible sound is associated with an existing combination of keystrokes. For example, a voice activated word processing application would need to be retrained when a new user who pronounces words differently than the original user begins to operate the device. However, since voice activated word processing applications rarely involve editing the commands previously associated with audible sounds, such editing oftentimes proves difficult. Thus, since voice activated dialers require frequent editing of the telephone numbers associated with a spoken word or phrase during the initial training of the device, the aforementioned limitation has presented an obstacle to the widespread acceptance of voice activated dialers. Moreover, while many such difficulties would be eased by incorporating a display, for example, a liquid crystal diode (or "LCD") display into the voice activated dialer, such a modification would add greatly to the cost of such a voice activated dialer.

Therefore, what is needed is a voice activated dialer configured for ease of use during retraining operations. It is, therefore, an object of the invention to provide such a device. There is a further need for a voice activated dialer configured for use with a wide variety of existing telephony devices without necessitating substantial modification thereto. It is, therefore, a further object of the invention to provide such a device.

SUMMARY

In one embodiment, the invention is directed to a telephone system comprising a base, a handset and a transmission line which couples the base to the handset. Coupled to the transmission line at a location intermediate the base and handset is a voice recognition/voice tone generation (or "VR/VTG") circuit for detecting an audio signal originating at sound detection/generation (or "SD/G") circuitry located within the handset and generating, in response thereto, a series of tones for propagation along the transmission line. Telephone circuitry within the base detects the series of tones and establishes a call in response thereto. In one aspect thereof, the VR/VTG circuit is located entirely within a first housing having first and second connector plugs supportably mounted thereto. In this aspect, the transmission line is comprised of a first link extending from the telephone circuitry to the first connector plug, a second link extending from the first connector plug to the second connector plug and located entirely within the first housing, and a third link extending from the second connector plug to the SD/G circuitry. In further accordance with this aspect of the invention, the VR/VTG circuit is coupled to the second link of the transmission line.

In a further aspect thereof, the base of the telephone system includes a second housing within which the telephone circuitry is entirely located and a third connector plug, coupled to the telephone circuitry, supportably mounted to the second housing. In this aspect, a first end of the first link is coupled to the third connector plug and a second end of the first link is coupled to the first connector plug. In a still further aspect thereof, the handset of the telephone system includes a third housing within which the SD/G circuitry is entirely located and a fourth connector plug, coupled to the SD/G circuitry, supportably mounted to the third housing. In this aspect, a first end of the third link is coupled to the second connector plug and a second end of the third link is coupled to the fourth connector plug.

In still further aspects thereof, the VR/VTG circuit is comprised of a means for detecting a dial tone on the second link of the transmission line, a means for generating a first electrical signal in response to detection of a dial tone on the second link of the transmission line, a means for detecting a second electrical signal on the second link of the transmission line, and a means for converting the second electrical signal into the series of tones used by the telephone circuitry to establish a connection. In this aspect of the invention, the SD/G circuitry of the telephone handset converts the first electrical signal into audible sound while the second electrical signal is generated by the SD/G circuitry in response to detection of an audible sound thereby.

In yet another aspect thereof, the telephone system further includes a storage facility coupled to the VR/VTG circuit and located entirely within the first housing. In this aspect, the storage facility maintains a plurality of entries, each comprised of a first data block defining an audible identifier of a first destination terminal and a second data block defining a series of tones capable of causing the telephone circuitry within the base to establish a call to the first destination terminal, and the VR/VTG circuit generates the series of tones defined by the second data block upon detecting a first audio signal, originated at the SD/G circuitry, matching the audible identifier defined in the first data block.

In still further aspects thereof, the telephone system may further include a data keypad or data and control keypads, each comprised of at least one key coupled to the VR/VTG circuit and formed along the first housing. The data keypad is used to enter the second data block for each one of the plurality of entries while the first and second data blocks of each one of the plurality of entries are modifiable by the VR/VTG circuit in response to instructions issued thereto by the control keypad.

In another embodiment, the present invention is directed to a method for upgrading a telephone to include voice activated dialing features. To upgrade the telephone, one end of a first transmission line coupling base and handset portions of the telephone is disconnected. The disconnected end of the first transmission line is then connected to a voice activated dialer. A second transmission line is coupled between the voice activated dialer and the disconnected one of the base or handset. As the voice activated dialer is configured to recognize a first audible sound detected by the handset and transmit a telephone number, associated with the recognizable audible sound, to telephone circuitry located within the base, the telephone is now capable of performing various voice activated dialing features. In further aspects of this embodiment of the invention, the first end of the transmission line is disconnected and the second end of the second transmission line connected from/to the base or, alternately, the second end of the transmission line is disconnected and the second end of the second transmission line connected from/to the handset.

In still another embodiment, the present invention is directed to a voice activated dialer comprising means for maintaining a plurality of entries in a storage facility, means for detecting a dial tone, means for generating a prompt in response to detection of a dial tone, means for detecting an audibilization uttered by a user in response to the prompt, means for comparing the detected audibilization to audible identifiers stored in a first data block of each one of the plurality of entries, and means for generating, from a tone sequence stored in a second data block of an entry containing an audible identifier which matches the detected audibilization, a series of tones capable of causing telephone circuitry associated therewith to establish a call.

In one aspect of this embodiment of the invention, the voice activated dialer includes connection circuitry which interconnects the voice activated dialer between base and handset portions of a telephone. In another, further, aspect thereof, the connection circuitry includes a first connection interface for coupling the voice activated dialer to the base portion of the telephone and a second connection interface for coupling the voice activated dialer to the handset portion of the telephone. In this aspect, the base and handset portions of the telephone are coupled to one another through the voice activated dialer. In still other aspects thereof, the connection circuitry includes a transmission line coupling the first and second connection interfaces and the entry maintaining means, dial tone detection means, prompt generation means, audibilization detection means, comparing means and tone generation means all reside within a circuit coupled to the transmission line.

In a still further aspect thereof, the voice activated dialer includes a normally closed switch provided along the transmission line. When the switch is in the closed position, the base portion of the telephone is coupled to the voice activated dialer and to the handset portion of the telephone via the transmission line. Conversely, when the switch is in the open position, the base portion of the telephone is isolated from the voice activated dialer and the handset portion of the telephone while the voice activated dialer remains coupled to the handset portion of the telephone. In other aspects thereof, the voice activated dialer may also include means for selectively opening and closing the normally closed switch, an interface for issuing instructions initiating modification of a selected entry maintained in the storage facility, means for opening the normally closed switch in response to receipt of an instruction initiating modification of the selected entry, means for issuing an instruction initiating modification of a first data block of the selected entry and means for issuing a second instruction initiating modification of a second data block of the selected entry.

DETAILED DESCRIPTION

Figure 1:
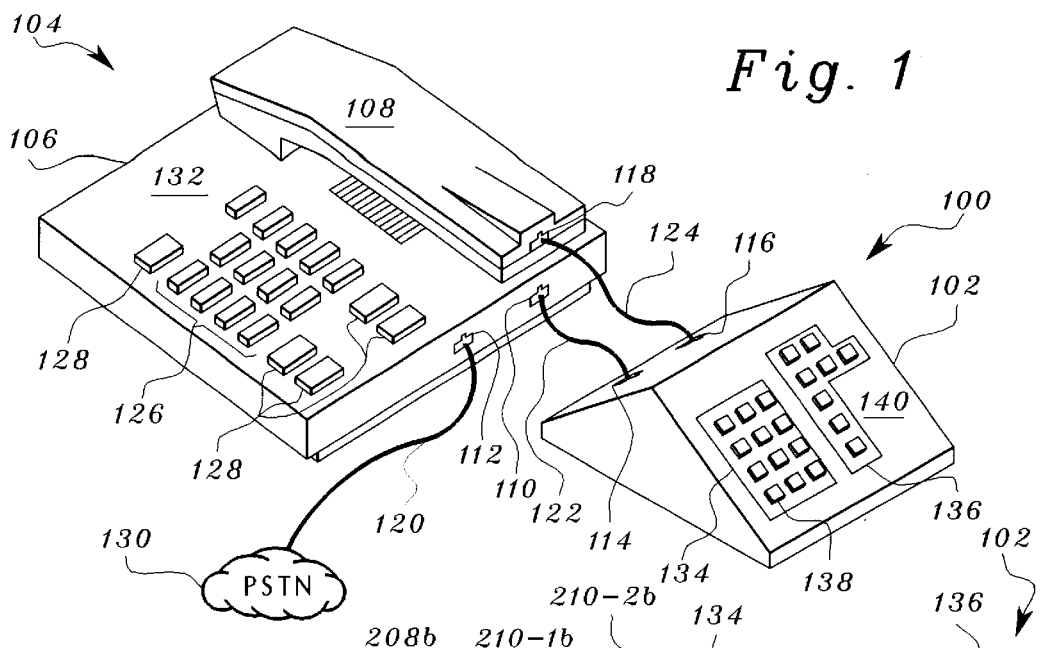
FIG. 1 is a perspective view of a conventionally configured telephone having a voice activated dialer coupled between base and handset portions thereof.

Referring first to FIG. 1, a telephone system 100 which includes a voice activated dialer 102 constructed in accordance with the teachings of the present invention and interconnected with various components of a telephone 104 will now be described in greater detail. As may now be seen, the voice activated dialer 102 is coupled between a base portion 106 and a handset portion 108 of the telephone 104. More specifically, a first end of transmission line 122, preferably, a 4-wire line commonly used in telephony devices such as telephones and the like, is coupled to the base 106 of the telephone 104 by jack 110 and a second end of the transmission line 122 is coupled to the voice activated dialer 102 by the jack 114. Similarly, a first end of transmission line 124 which, like the transmission line 122, is preferably a 4-wire line, is coupled to the voice activated dialer 102 by the jack 116 and a second end of the transmission line 124 is coupled to the handset 108 of the telephone 104 by the jack 118.

As is common in the art, the telephone 104 is a multiple line telephone coupled to a wireline telecommunications network 130, for example, either the PSTN or a private network, by transmission line 120. Provided along a front side surface 132 thereof are plural data keys 126 and control keys 128, all of which are electrically connected with conventionally configured telephone circuitry (not shown) supportably mounted within the base 106. As is common in the art, the telephone 104 is provided with twelve data keys 126, more specifically, the 0–9, "#" and "*" keys. As is also common in the art, once a dial tone has been acquired, the telephone 104 is operated by depressing the data keys 126 in a selected sequence. In response thereto, the telephone circuitry generates a tone corresponding to each key depressed as part of the selected sequence and places the generated tones on the transmission lines 120 and 122. Conversely, by depressing a selected one of the control keys 128, the telephone circuitry will initiate a corresponding control function which may variously initiate, modify or terminate a call. For example, many conventionally configured telephones have control keys to perform operations commonly referred to in the art as "hold", "redial", "speed dial", "flash" and "speaker" features. Of course, the foregoing control operations are purely exemplary and it is specifically contemplated that the control keys 128 may instead perform other features.

As disclosed herein, the telephone system 100 includes a "multi-line" telephone having plural telephone lines coupled to the PSTN 130 via a private branch exchange (or "PBX") system (not shown). Accordingly, at least two of the illustrated control keys 128 are "line select" keys used to select between the plural telephone lines when a telephone call is being initiated. When the handset 108 goes "off-hook", the telephone circuitry inside the base 106 generates a first tone to indicate that a local connection, i.e., to another telephone coupled to the PBX system, may be established. By depressing a selected one of the data keys 126, for example, the "9" key, the PBX system provides the telephone 104 with a dial tone indicating that an outside connection, i.e., to another telephone coupled to the PSTN 130, may be established. Typically, in many PBX systems, the dial tone is placed on a default one of the multiple telephone lines whenever the handset 108 goes off-hook and may be released in favor of another telephone line by selecting the control key 128 corresponding to the desired line.

Apart from the coupling of the voice activated dialer 102 between the base 106 and the handset 108, the telephone system 100 is otherwise conventionally configured. Accordingly, it is contemplated that the voice activated dialer 102 may be readily coupled to an existing telephone, such as the telephone 104 illustrated in FIG. 1, by simply disconnecting the handset 108 from the base 106 by removing a second end of the first transmission line 122 coupling the base 106 and the handset 108 from the jack 118, inserting the second end of the first transmission line 122 into the jack 114 and inserting respective ends of the second transmission line 124 into the jacks 116 and 118. Conversely, the voice activated dialer 102 may be coupled to the telephone 104 by disconnecting the handset 108 from the base 106 by removing a first end of the second transmission line 124 coupling the base 106 and the handset 108 from the jack 110, inserting the first end of the second transmission line 124 into the jack 116, and inserting respective ends of the first transmission line 122 into the jacks 110 and 114. Of course, regardless of the particular manner by which the voice activated dialer 102 is coupled to the telephone 104, FIG. 1 shows the resultant telephone system 100.

As may be further seen in FIG. 1, provided along a front side surface of the voice activated dialer 102 are a data entry keypad 134 and a control keypad 136. As will be more fully described below, the data entry keypad 134 is used to enter data into a first segment of a selected entry of a telephone directory maintained in an internal storage facility (not visible in FIG. 1) by the voice activated dialer 102. As disclosed herein, in a fashion similar to the base 106, the data entry keypad 134 is comprised of twelve data keys 138, specifically, the 0–9, "#" and "*" keys. Unlike the control keys 128 of the base 106, however, manipulation of the various keys forming part of the control keypad 136 initiates a number of operations for manipulating selected entries (or selected data blocks thereof) of the telephone directory maintained by the voice activated dialer 102. These operations will be more fully described later with respect to FIGS. 3–6.

Figure 2:
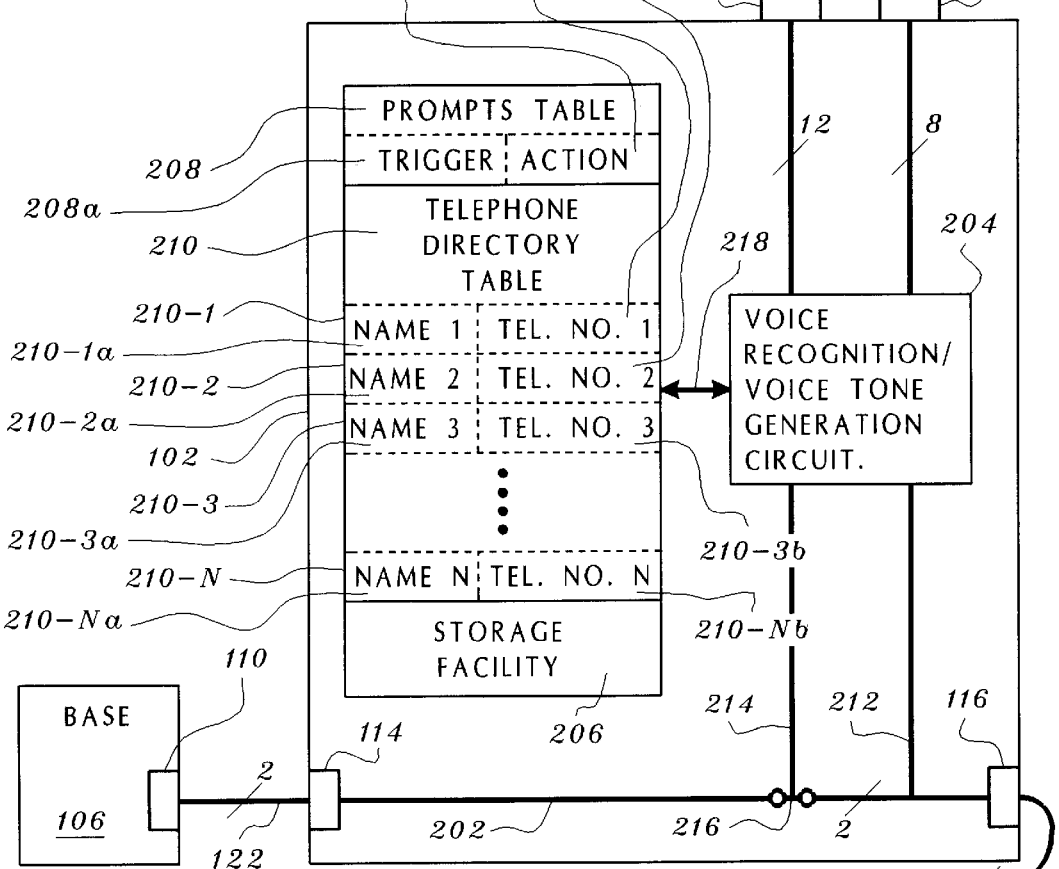
FIG. 2 is a block diagram of the voice activated dialer of FIG. 1.

Referring next to FIG. 2, the voice activated dialer 102 will now be described in greater detail. As may now be seen, the voice activated dialer 102 includes a transmission line 202 which electrically connects the jack 114 to the jack 116 within an interior portion of the housing illustrated in FIG. 1. Coupled to the transmission line 202 by lines 212 and 214 is a voice recognition/voice tone generation (or "VR/VTG") circuit 204. The line 212 is a bi-directional analog line over which the VR/VTG circuit 204 receives electrical signals, originating at either the base 106 or the handset 108, which are convertible into audible sounds. The line 214 is a unidirectional control line over by which the VR/VTG circuit 204 selectively opens or closes a "normally closed" switch 216. When the switch 216 is closed, the handset 108 is coupled to the base 106 through the voice activated dialer 102. When the switch 216 is opened, however, the handset 108 is isolated from the base 106 and may only be used for communication with the voice activated dialer 102.

The VR/VTG circuit 204 performs various functions for the voice activated dialer 102. More specifically, electrical signals being exchanged between the base 106 and the handset 102 over a path which includes the transmission line 202 are also received by the VR/VTG circuit 204 via the transmission line 212. A/D circuitry forming part of the VR/VTG circuit 204 digitizes analog electrical signals received over the transmission line 212. The digitized electrical signals are then propagated to a processor subsystem also forming part of the VR/VTG circuit 204. The processor subsystem, which, for example, may be an appropriately sized microprocessor, compares the received digitized electrical signals to selected digital signals stored in a storage facility 206, for example, a non-volatile random access memory (or "NVRAM"), coupled to the VR/VTG circuit 204 by a bi-directional address, data and control bus 218. If a match is detected between the received digitized electrical signal and a digital signal stored in memory, the VR/VTG circuit 204 "recognizes" an audible sound which generated the electrical signal being transmitted over the transmission line 202. Upon recognizing an audible sound, the VR/VTG circuit 204 issues a response thereto. Depending on the particular audible sound recognized, the response may either be comprised of the generation of a sequence of audible tones to establish a telephone call between the telephone 104 and a selected destination terminal, for example a second telephone, or the generation of an audibilization, commonly known in the art as a "prompt" and generally comprised of one or more words for providing a user with useful information and/or instructions on how to proceed when operating the voice activated dialer 102.

The VR/VTG circuit 204 recognizes audible sounds using data maintained by the storage facility 206. More specifically, the storage facility 206 includes a first (or "prompts") table 208 and a second (or "telephone directory") table 210. The prompts table 208 includes plural entries (only one of which is shown in FIG. 2 for ease of illustration), each comprised of a first (or "trigger") segment 208a and a second (or "action") segment 208b. The trigger 208a describes a condition, for example, a detection of a dial tone, in response to which the corresponding action 208b, for example, audibilization of a specified prompt, should be performed by the VR/VTG circuit 204. The telephone directory 210, on the other hand, is comprised of a plurality of entries 210-1 through 210-N, each respectively comprised of a first (or "name") data block 210-1a through 210-Na and a second (or "telephone number") data block 210-1b through 210-Nb. Each first data block 210-1a through 210-Na of one of the entries 210-1 through 210-N contains a digitized version of a name input the storage facility 206 by the user of the voice activated dialer 102 while the corresponding second data block 210-1b through 210-Nb contains a digitized version of a telephone number input the storage facility 206, again, by the user of the voice activated dialer 102, as the telephone number to be associated with the name previously input thereto.

As will be more fully described below, certain ones of the digitized audible inputs detected by the VR/VTG circuit 204 as being propagated along the transmission line 202 are first compared to each trigger 208a stored in the prompts table 208 to determine if the VR/VTG circuit 204 needs to take certain action in response to the detection thereof and, if the digitized audible input matches one of the triggers 208a, the processor subsystem will execute the corresponding action 208b. If the digitized audible input fails to match any one of the triggers 208a (or if the VR/VTG circuit 204 is performing an operation where an audible input is known to relate only to the telephone directory 210), the VR/VTG circuit 204 will compare the digitized audible input to the contents of the first data blocks 210-1a through 210-Na of the telephone directory 210 and, if a match is detected, the VR/VTG circuit 204 would then generate a series of tones describing the number stored in the corresponding one of the second data blocks 210-1b through 210-Nb.

Figure 3:
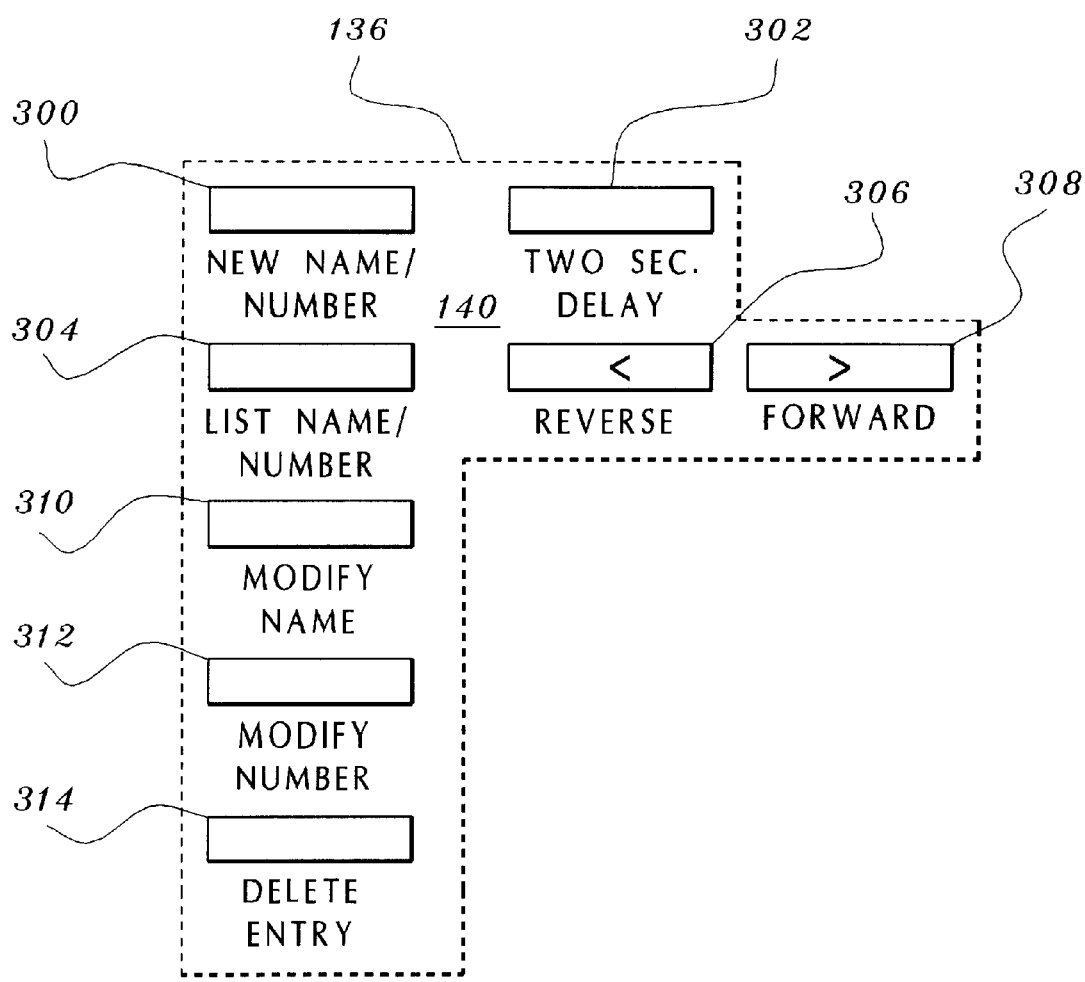
FIG. 3 is a fragmentary top side view of the voice activated dialer of FIG. 1.

Referring next to FIG. 3, the control keypad 136 provided on a front side surface 140 of the voice activated dialer 102 will now be described in greater detail. As may now be seen, the control keypad 136 includes first, second, third, fourth, fifth, sixth, seventh and eighth control keys 300, 302, 304, 306, 308, 310, 312 and 314, each of which is a conventionally configured "push-button" key electrically connected to the VR/VTG circuit 204 by a corresponding control line. By actuating a selected one of the control keys 300 through 314, the user issues an instruction to the VR/VTG circuit 204. In response to an instruction issued by a user by depressing one or more of the control keys 300 through 314, the processor subsystem of the VR/VTG circuit 204 modifies the contents of the telephone directory table 210 maintained in the storage facility 206.

More specifically, by selecting the first control key 300, a "new name and number" command is issued to the VR/VTG circuit 204. Upon receiving the "new name and number" command in response to issuance of a "name prompt", the VR/VTG circuit 204 enters a training mode described in greater detail later with respect to FIG. 5. Briefly, however, upon entering the training mode, the VR/VTG circuit 204 first isolates the voice activated dialer 102 and the handset 108 from the base 106 of the telephone 104 by opening the switch 216. The VR/VTG circuit 204 then creates a new entry in the telephone directory table 210, places the next digitized audible input in a first data block of the newly created entry and places the next sequence of data inputs received from the data input pad 134 in a second data block of the newly created entry. While a newly created entry may be placed anywhere within the telephone directory table 210, it is specifically contemplated that placement of the newly created entry at the top of the previously constructed telephone directory table 210 is one suitable technique which may be used. Once the newly created entry is placed within the telephone directory table 210 maintained by the storage facility 206, when the VR/VTG circuit 204 later recognizes a digitized audible input as matching the digitized audibilization placed in the first data block of the newly created entry, the VR/VTG circuit 204 will then generate a tone sequence corresponding to the digitized number stored in the second segment of the newly created entry.

The second control key 302 is used during entry of a data input sequence using the data input pad 134 to insert a time delay into the sequence. By depressing the second control key 302, a "insert two second delay" command is issued to the VR/VTG circuit 204. In response, the VR/VTG circuit 204 inserts a two second time delay into the sequence of digits being received from the data input keypad 134 for placement in the second data block of a newly created entry in the telephone directory table 210. When the contents of the second data block of the entry are later retrieved by the VR/VTG 204 circuit during an operation, the VR/VTG circuit 204 will first generate a first series of audible tones corresponding to the digits preceding the time delay for placement on the transmission line 202, pause for two seconds, and then generate a second series of audible tones corresponding to the digits succeeding the time delay, again for placement on the transmission line 202. Of course, other appropriate time delays may be used in place of the aforementioned two second time delay. The "insert two second time delay" command is useful to enter extension numbers or identifying information, for example, when a telephone called is answered by an automated service and a time delay is needed before the service is ready to accept additional information which enables the automated service to further route the call. Typically, the time delay is needed to permit the automated service to complete an audible prompt requesting additional information in the form of a string of digits. Of course, if a longer time delay is necessary, the second control key 302 may be repeatedly actuated, each time, to add an additional two seconds between transmission of the audible tones corresponding to the digits preceding the time delay and transmission of the audible tones corresponding to the digits succeeding the time delay.

The third control key 304 causes the voice activated dialer 102 to generate a respective audibilization for each entry 210-1 through 210-N maintained in the telephone directory table 210. More specifically, by selecting the third control key 304, a "list names" command is issued to the VR/VTG circuit 204. Upon receiving the "list names" command in response to issuance of a first prompt more fully described later, the VR/VTG circuit 204 enters an edit mode described in greater detail later with respect to FIG. 6. Briefly, however, upon entering the edit mode, the VR/VTG circuit 204 first isolates the voice activated dialer 102 and the handset 108 from the base 106 of the telephone 104 by opening the switch 216. The VR/VTG circuit 204 then retrieves the contents of the first data block 210-1a of the first entry 210-1 in the telephone directory table 210. Using the contents of the first data block 210-1a, the VR/VTG circuit 204 generates an electrical signal which, when placed on the transmission line 202, propagates to the handset 102 where the electrical signal is converted by the speaker 200 into an audible sound comprised of the name previously stored in the first data block 210-1a of the entry 210-1 by the user while operating the voice activated dialer 102 in training mode. The above described process is then repeated by the VR/VTG circuit 204 until the name contained in the first data block 210-1a through 210-Na for each entry 210-1 through 210-N is audibilized.

The electrical signal generated by the VR/VTG circuit 204 in this embodiment is produced using the information contained in the first data block 210a and 210b of each entry 210-1 through 210-N maintained in the telephone directory table 210. As the contents of each one of the first data blocks 210-1a through 210-Na is a digitized electrical signal representative of the name originally spoken by the user during operation of the voice activated dialer 102 during training for association with a telephone number shortly provided thereafter, again, by the user, the VR/VTG circuit 204 may readily generate an electrical signal which, when propagated to the speaker 200 of the handset 108, is converted into an audibilization of the name stored in that data block 210-1 through 210-Na.

In an alternate embodiment of the invention, it is contemplated the voice activated dialer 102 may instead be configured to issue such that actuation of the third control key issues a "list names and numbers" command to the VR/VTG circuit 204. Of course, to issue both the name and phone number for each entry 210-1 through 210-N, the contents of both the first and second data blocks 210-1a and 210-ab through 210-Na and 210-Nb must be retrieved by the VR/VTG circuit 204 for each entry 210-1 through 210-N and the VR/VTG circuit 204 must instead generate an electrical signal which, when received by the speaker 200, produces an audibilization of both the name and the telephone number maintained in each entry 210-1 through 210-N of the telephone directory table 210. In this alternate embodiment, however, it should be noted that, while the VR/G circuit 204 uses the second data block 210-1b to produce an electrical signal capable of causing the speaker 200 to generate an audibilization of the telephone number previously input by the user, the telephone number was previously input the second data block 210-1b as a series of tones. Thus, to generate an audibilization of the telephone number maintained in the second data block 210-1b, the VR/VTG circuit 204 must first convert the contents of the second data block 210-1b into an electrical signal which, in turn, is convertible into an audibilization of the numbers represented by the sequence of tones stored in the second segment 210-1b. To do so, a number table must be maintained in the storage facility 206, either as a discrete table (not shown) or as a portion of the prompts table 208. For example, if included as part of the prompts table, the first data block 208a of an entry in the numbers portion of the prompts table 208 would contain a digitized representation of a tone and the second data block 208b would be a representation of an audibilization of the number corresponding to that tone. Thus, the VR/VTG circuit 204 would compare each tone contained in the second data block 210-b to the first data block 208a of each entry in the numbers portion of the prompts table 208 and, upon identifying a match therebetween, the contents of the second data block 208b of the matching entry 208 is retrieved to form part of the electrical signal to be transmitted by the VR/VTG circuit 204.

The fourth and fifth control keys 306 and 308 enables the user to quickly move through the entries 210-1 through 210-N maintained in the telephone directory table 210. More specifically, by selecting the fourth control key 306 while the VR/VTG circuit 204 is responding to a previously selected "list names and numbers" command, a "reverse" command is issued to the VR/VTG circuit 204. Upon receiving the reverse command, the VR/VTG circuit 204 will interrupt the on-going audibilization of an entry in the telephone directory table 210 and initiate audibilization of the prior entry in the telephone directory table 2106. The VR/VTG circuit 204 will continue to proceed through the telephone directory table 210 in the manner previously described. Thus, unless another command is issued to the VR/VTG circuit 204 before it completes the generation of the audibilization of the prior entry in the telephone directory table 2106, the VR/VTG circuit 204 will subsequently initiate audibilization of the entry which was previously interrupted.

In contrast, by selecting the fifth control key 308 while the VR/VTG circuit 204 is responding to a previously selected "list names and numbers" command, a "forward" command is issued to the VR/VTG circuit 204. Upon receiving the forward command, the VR/VTG circuit 204 will interrupt the on-going audibilization of an entry in the telephone directory table 210 and initiate audibilization of a subsequent entry in the telephone directory table 210. The VR/VTG circuit 204 will then continue to proceed through the telephone directory table 210 in the manner previously described. Thus, unless another command is issued to the VR/VTG circuit 204, the only effect of a single "forward" command during a a "list names and numbers" shall be that a single entry in the telephone directory table 210 will be incompletely audibilized.

The sixth, seventh and eighth control keys 310, 312 and 314 collectively enable the user to edit entries in the telephone directory table 210 with relative ease. More specifically, by selecting the sixth control key 310 while the VR/VTG circuit 204 is responding to a previously selected "list names and numbers" command, a "modify name" command is issued to the VR/VTG circuit 204. Upon receiving the modify name command, the VR/VTG circuit 204 will interrupt the on-going audibilization of an entry in the telephone directory table 206 and initiate a prompt sequence requesting that the user say the name to be entered into the first segment of the entry which was being audibilized when the sixth control key 310 was depressed. After replacing the existing name with the new one, the VR/VTG circuit 204 will generate an audibilization of the new name added to the telephone directory table 210 and the existing telephone number which the new name has been associated.

The seventh and eighth control keys 312 and 314 operate in a similar manner. Specifically, by instead selecting the seventh control key 312 while the VR/VTG circuit 204 is responding to a previously selected "list names and numbers" command, a "modify number" command is issued to the VR/VTG circuit 204. Upon receiving the modify name command, the VR/VTG circuit 204 will interrupt the on-going audibilization of an entry in the telephone directory table 210 and initiate a prompt sequence requesting that the user enter, using the data keypad 134, the telephone number to be entered into the second segment of the entry which was being audibilized when the seventh control key 312 was depressed. After replacing the existing name with the new one, the VR/VTG circuit 204 will generate an audibilization of the existing name stored in the entry being modified and the new telephone number added to the telephone directory 210 and associated with the existing name of the entry being modified.

Finally, by selecting the eighth control key 314 while the VR/VTG circuit 204 is responding to a previously selected "list names and numbers" command, a "delete entry" command is issued to the VR/VTG circuit 204. Upon receiving the delete entry command, the VR/VTG circuit 204 will interrupt the on-going audibilization of an entry in the telephone directory table 206 and generate a prompt requesting that the user confirm that the selected entry is to be deleted. If the user then selects the eighth control key 314 a second time, the VR/VTG circuit 204 will delete the entire entry (both name and telephone number) being audibilized when the first delete entry command was received. Alternately, the generated prompt consist solely of an audibilization retrieved from the prompts table 208 or a combination of an audibilization retrieved from the prompts table 208 combined with an audibilization of either the entry being deleted or the first segment thereof For example, the prompt sequence may, in these alternate configurations, either be "to delete entry, press delete again", "to delete [Bob Smith 214.555.1234], press delete again" or "to delete [Bob Smith], press delete again."

It should be readily appreciated that the control keypad 136 provides a user interface for a voice activated device, in the disclosed embodiment, the voice activated dialer 102, characterized by enhanced ease of use when compared to the user interfaces for existing voice activated devices. Furthermore, by eliminating the need for either an alphanumerical keyboard or a display, the disclosed user interface is both less expensive to manufacture and less intimidating in appearance to prospective users. This improved design for a user interface for voice activated devices has been achieved by providing the user interface with: (1) a first control key which effectively initiates an audibilized playback of the entire contents of a directory comprised of plural entries, each having a first segment for maintaining data for recognizing an audibilization and a second segment for maintaining data for executing a command, here, the generation of a sequence of tones, to initiate a function; (2) one or more control keys which enable the user to selectively modify the audibilization recognition segment, the command segment; and/or (3) one or more control keys enabling the user to speed through the audibilized playback in either direction by terminating the audibilization of a single entry in a table being audibilized and immediately restarting the audibilized playback of the table at either a preceding or succeeding entry thereof without the need for further user inputs.

Figure 4:
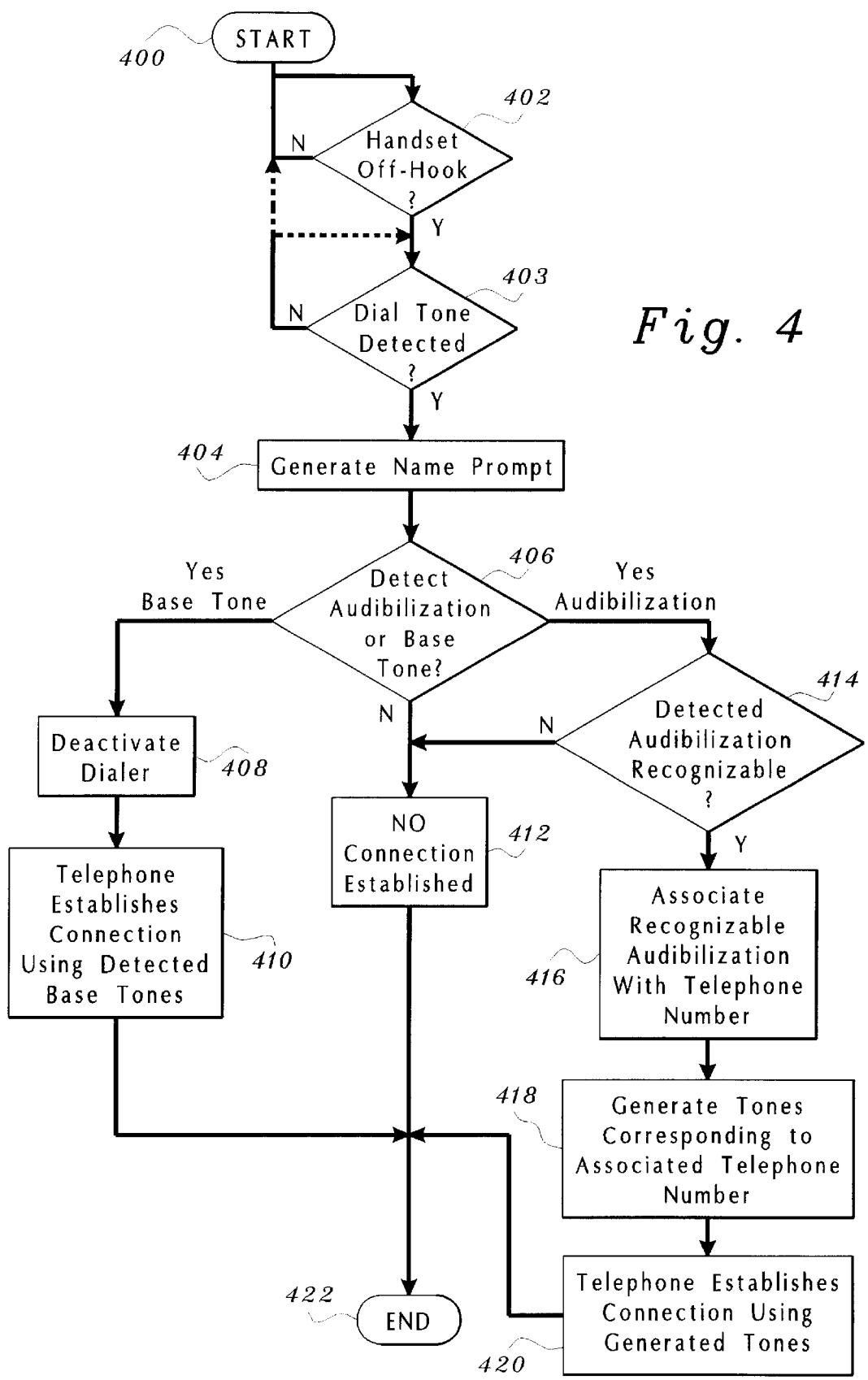
FIG. 4 is a flow diagram of a dialing process executable by the voice activated dialer of FIG. 1.

Referring next to FIG. 4, a method of establishing a connection between an originating terminal, here, the telephone 100 and a destination terminal, typically, a second telephone, using the voice activated dialer 102 will now be described in greater detail. The method commences at step 400 and proceeds to step 402 where the voice activated dialer 102 awaits a signal indicating that the handset 108 has gone "off-hook". When a user lifts the handset 108 from a cradle portion of the base 106 to either initiate a call from the telephone 100 or to program the voice activated dialer 102, circuitry within the telephone 100 generates an off-hook signal. If the voice activated dialer 102 detects the off-hook signal at step 402, the method proceeds to step 403 to await acquisition of a dial tone by the telephone 100. If, however, the VR/VTG circuit 204 fails to detect an off-hook signal, the VR/G circuit 204 determines that the handset 102 remains "on-hook" and the method returns to step 402 to continue awaiting an indication that the handset 108 has gone off-hook.

As previously mentioned, upon detecting the off-hook signal, the method proceeds to step 403 to await the detection of a dial tone by the VR/VTG circuit 204 and, upon detecting a dial tone, the method then proceeds to step 404 where the VR/VTG circuit 204 generates a first audible prompt. If, however, the VR/VTG circuit 204 fails to detect a dial tone, the method will return to step 403 to continue awaiting detection of a dial tone if the handset 108 remains off-hook or will return to step 402 if the handset 108 goes on-hook.

It should be clearly understood that the process by which the telephone 100 acquires a dial tone will vary depending on its type and/or configuration. However, the method by which the voice activated dialer 102, when coupled between base 106 and handset 108 in the manner illustrated in FIGS.

1–2 dials a selected telephone number in response to a recognizable audibilization by the user of the telephone 100 after the VR/VTG circuit 204 detects a dial tone on the transmission line 202 is the same regardless of the particular manner by which the telephone 100 acquires the dial tone. For example, if the telephone 100 is a single line telephone in which the telephone 100 is directly coupled to the PSTN 130 via a Regional Bell Operating Company (or "RBOC", not shown), the telephone 100 would acquire a dial tone upon detection that the handset 108 has gone off-hook. Once acquired, the dial tone is then transmitted to the speaker 200 of the handset 108 via the jack 110, the transmission line 122, the jack 114, the transmission line 202, the jack 116, the transmission line 124 and the jack 118. If, however, the telephone 100 is a multi-line telephone coupled to the PSTN 130 via the RBOC, the telephone would not acquire a dial tone until the handset 108 goes off-hook and the user selects a line, for example, by depressing an appropriate one of the control keys 128. Of course, if the multi-line telephone is configured for default selection of a particular line upon going off-hook, the multi-line phone would, from the user's perspective, acquire dial tone in the same manner as the single line telephone.

Telephones coupled to the PSTN 130 via a PBX acquire a dial tone in a slightly different manner. Both a single line telephone or a multi-line telephone configured for default selection of a particular line when going off-hook would not acquire a dial tone until the handset goes off-hook and the user instructs the telephone to acquire an outside line, for example, by dialing "9". In contrast, the user would have to go off-hook, select a line by depressing an appropriate one of the control keys 128 and then instruct the telephone to acquire an outside line, again, for example, by dialing "9", if the telephone 100 was coupled to the PSTN 130 via a PBX and was a multi-line telephone without default line selection.

As previously set forth, upon the VR/VTG circuit 204 detecting the presence of a dial tone on the transmission line 202, the method proceeds to step 404 where the VR/VTG circuit 204 generates a first voice prompt for placement on the transmission line 202. Returning to step 404, upon determining that the handset 108 has gone off-hook, the VR/VTG circuit 204 retrieves the contents of a first entry from the prompts table 208 and, using the retrieved data, generates a first audible prompt for placement on the transmission line 202. Once place on the transmission line 202, the first audible prompt, which, for example, may be comprised of the words "name please", is propagated to the speaker 200 where it is converted into audible sound. Proceeding on to step 406, upon hearing the first audible prompt, the user may chose to select a destination terminal conventionally or by using the voice dialer 102. To select a destination terminal conventionally, the user generates a series of tones by depressing various ones of the data keys 126 located on the base 106. Tones generated by the telephone circuitry located within the interior of the housing of the base 106 is placed on the transmission line 122 for propagation to the speaker 200 of the handset 102.

Upon detection of the base tones by the VR/VTG circuit 204 at step 406, the method proceeds to step 408 where the VR/VTG circuit 204 deactivates the voice dialer 102 from any further operations until the VR/VTG circuit 204 detects a next dial tone along the transmission line 202. While the voice dialer 102 is deactivated, signals originating at the base 106 and/or handset 108 will simply pass through the voice dialer 102 and continue on to the handset 108 and/or base 106. The method then proceeds to step 410 where the telephone establishes a connection with a selected destination terminal using the tones generated at the base 106. Having successfully established a connection at step 410, the method ends at step 422.

Returning to step 406, if, upon hearing the first audible prompt, the user chooses to select a destination using the voice dialer 102, the user utters one or more spoken words to identify the destination for which a call is to be established. For example, if the user wishes to establish a connection with "Bob Smith", the user may simply say "Bob". Upon detecting the user's audibilization at step 406, the method proceeds to step 414 where the VR/VTG circuit 204 determines if the detected audibilization is recognizable. To do so, the VR/VTG circuit 204 digitizes the detected audibilization and then compares the digitized audibilization to the digital data contained in the first data block 210-1a through 210-Na of each one of the entries 210-1 through 210-N maintained in the telephone directory table 210. If the digitized audibilization matches the digital data contained in the first data block of one of the entries 210-1 through 210-N, the VR/VTG circuit 204 determines that the detected audibilization is recognizable and the method proceeds to step 416.

At step 416, the VR/VTG circuit 204 associates the recognized audibilization with a telephone number. As previously mentioned, the second data block of each entry 210-1 through 210-N contains digital data which describes a telephone number. Accordingly, upon recognizing the detected audibilization by matching it to the digital data contained in the first data block of one of the entries 210-1 through 210-N, the VR/VTG circuit 204 associates the telephone number contained in the second field of that entry with the recognized audibilization. The VR/VTG circuit 204 retrieves the telephone number associated with the recognized audibilization and, proceeding to step 418, generates a series of tones, corresponding to that telephone number, for placement on the transmission line 202 via line 212. The telephone circuitry located within the base 106 detects the tones placed on the transmission line and, at step 420, the telephone establishes a connection to a destination terminal using the generated tones. Having established a connection at step 420, the method then ends at step 422.

Figure 5:
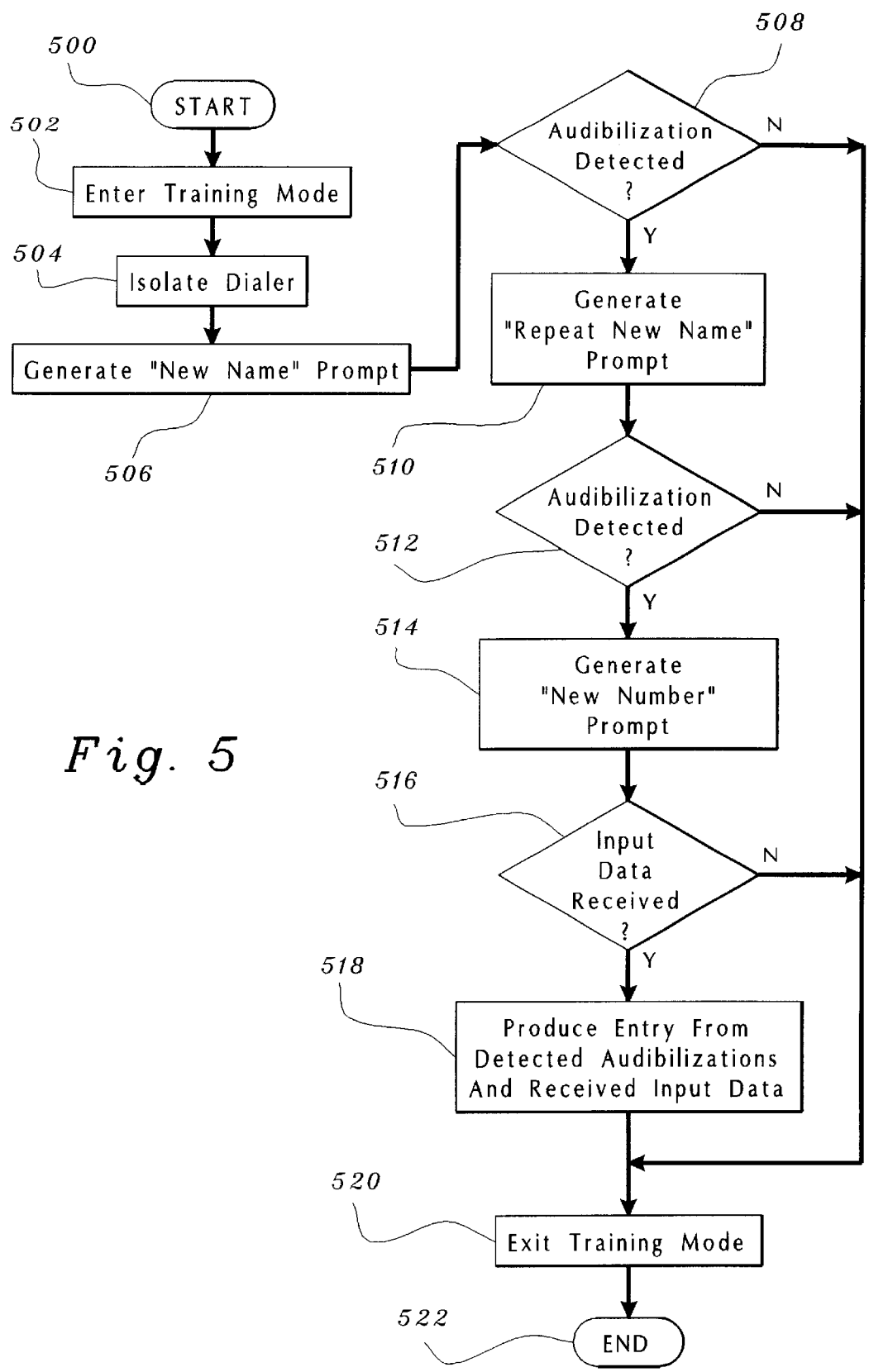
FIG. 5 is a flow diagram of a method for training the voice activated dialer of FIG. 1.
Figure 6A:
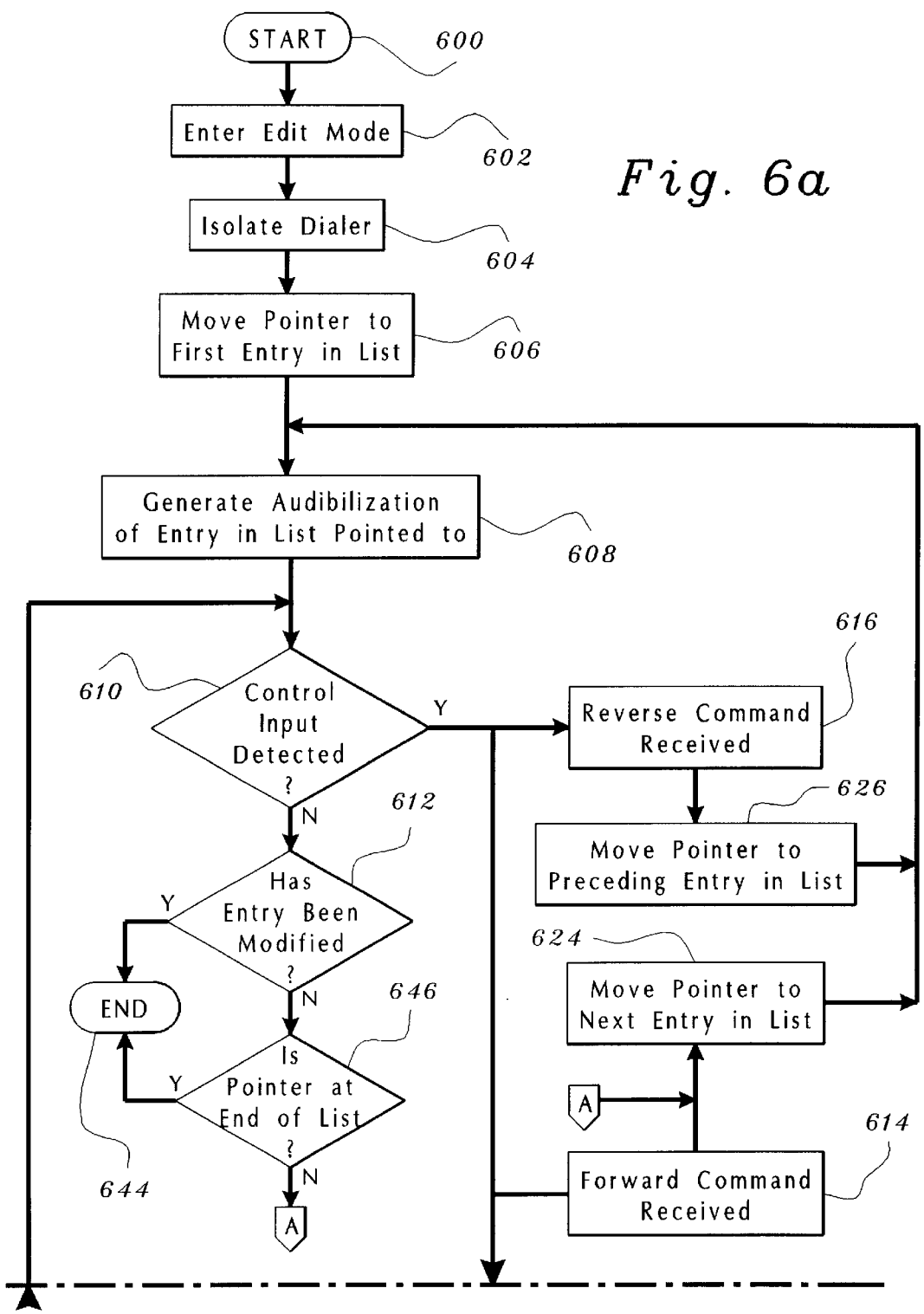
FIG. 6 is a flow diagram of a method for editing a telephone number directory maintained by a storage facility of the voice activated dialer of FIG. 1.
Figure 6B:
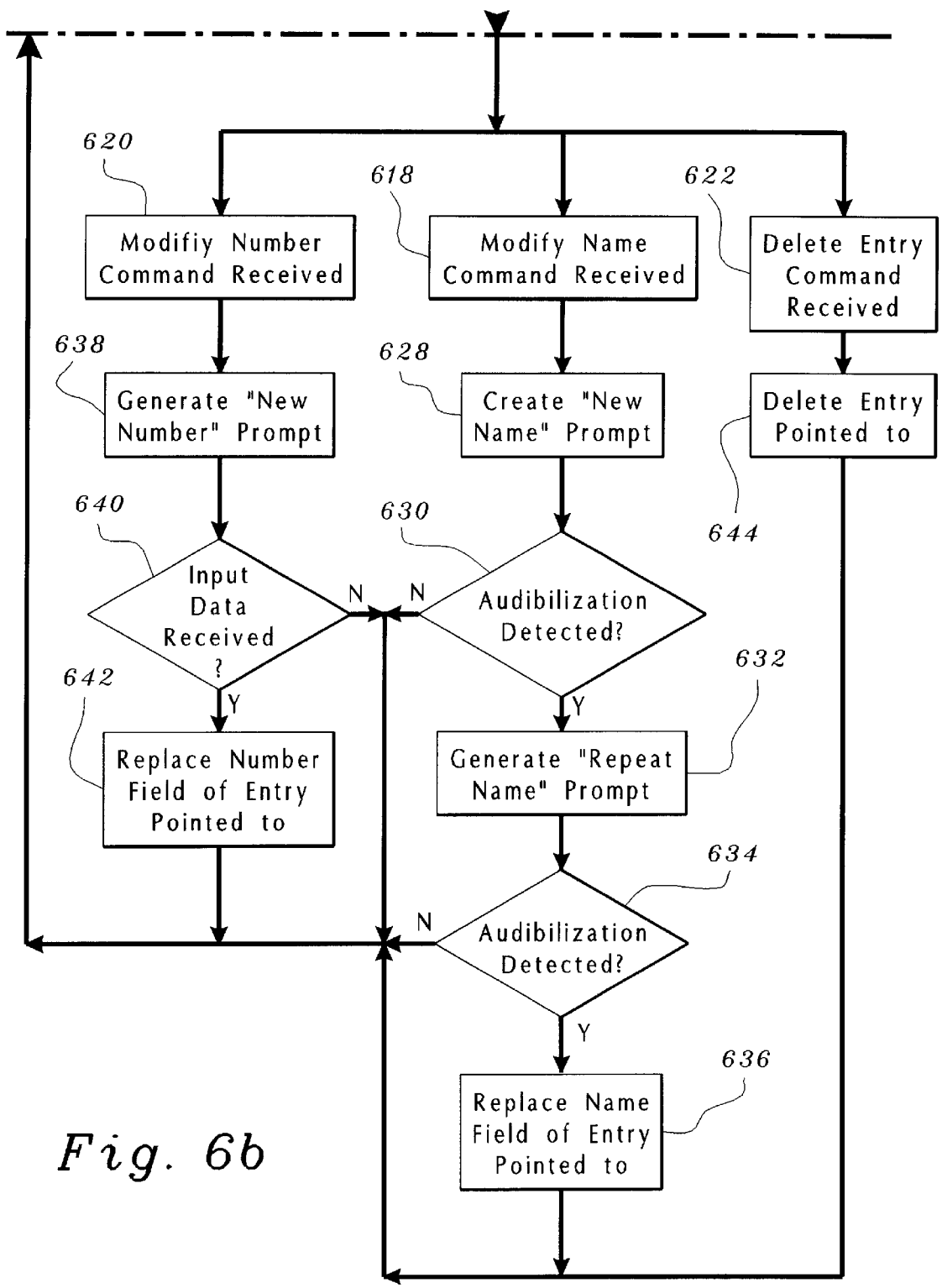

Referring next to FIGS. 5 and 6, various methods for modifying the contents of the telephone directory 210 will now be described in greater detail. The described methods are subdivided into operations in first and second modes. While both modes involve operations which will modify the contents of the telephone directory 210, the first (or "training") mode refers to those operations which will add one or more new entries to the telephone directory while the second (or "edit") mode refers to those operations which will modify an existing entry. The term "training" is used in conjunction with the first mode since, by adding a new entry to the telephone directory 210, the user is, in effect, training the voice activated dialer 102 to recognize a particular audibilization and providing an instruction, in the disclosed embodiment, generating a selected sequence of tones, corresponding to a telephone number, upon recognizing that particular audibilization.

A method for adding new entries into the telephone directory 210 will now be described in greater detail with reference to FIG. 5. The method commences at step 500 and, at step 502, the user switches the voice activated dialer 102 into training mode by selecting the first control button 300. Continuing on to step 504, upon detection of user selection of the first control button 300, the VR/VTG circuit 204 isolates the voice activated dialer 102 and the handset 108 from the base 106 by issuing an instruction on the line 214 to open the switch 216. Upon isolating the voice activated dialer 02 and the handset 108, the method proceeds to step 506 where the VR/VTG circuit 204 reviews the triggers 208a maintained in the prompt table 208 for a trigger which matches the received input (a selection of the first control button 300). Upon identifying a trigger which matches the received input, the VR/VTG circuit 204 accesses the action for the entry (not shown) in the prompt table having a matching trigger and, using the information contained in the accessed entry, the VR/VTG circuit 204 generates a first electrical signal for placement on the line 212. From the line 212, the first analog electrical signal propagates to the speaker 200 via the transmission lines 202 and 124. From the electrical signal, the speaker 200 generates an audible message requesting that the user speak the name or other sound to be recognizable to the voice activated dialer 102. It is contemplated that any audible message which adequately conveys this instruction to the user shall be suitable for use as the first prompt. For example, the audible message may simply be the phrase "name, please."

After generating the first audible prompt, the method proceeds to step 508 where the VR/VTG circuit 204 awaits detection of an audibilization by the user. If no audibilization is detected within a preselected time period, for example, 15 seconds, the method proceeds to step 520 where it exits the training mode by closing the switch 216 to reconnect the voice activated dialer 102 and the handset 108 to the base 106. If desired, the VR/VTG circuit 204 may generate an audible message from a second entry (also not shown) from the prompts table 208 (typically, an entry having, as its trigger, a logical statement describing the action having just occurred, i.e., "no response to first prompt within a 15 second response time" and having, as its action, an instruction to generate an audibilization signal of the aforementioned message), thereby advising the user that the voice activated dialer 102 is exiting the training mode. Having exited the training mode, the voice activated dialer 102 would return to step 402 (FIG. 4) and await detection of either the handset 108 going off-hook again or the selection of another one of the control keys 300 through 314. Rather than immediately exiting the training mode upon failure to detect an audibilization, in an alternate embodiment thereof, the method may instead return to step 506 and the first prompt repeated. In various further aspects of this alternate embodiment, the method may proceed to step 520 and exit the training mode after generating the first prompt a preselected number of times, for example, three, and failing to detect an audibilization within fifteen seconds or other preselected time period thereafter.

Returning to step 508, upon detecting an audibilization spoken by the user into the microphone 218, converted into an electrical signal thereby and propagated along the transmission lines 124 and 202, the method proceeds to step 510 where the VR/VTG circuit 204 converts the detected signal into a digital signal and stores the converted digitization of the signal in a buffer memory (not shown). Next, using the data maintained in a third entry in the prompt table 210, the VR/VTG circuit 204 generates a second (or "repeat new name") prompt, again in the form of an electrical signal, for placement on the line 212. From the line 212, the second electrical signal propagates to the speaker 200 via the transmission lines 202 and 124. From the second electrical signal, the speaker 200 generates a second audible message requesting that the user repeat the name previously spoken or other sound previously uttered at step 508. Again, it is contemplated that any audible message which adequately conveys this instruction to the user shall be suitable for use as the second prompt. Here, for example, the audible message may simply be the phrase "repeat name, please."

After generating the second audible prompt, the method proceeds to step 512 where the VR/VTG circuit 204 awaits detection of a second audibilization by the user. If no audibilization is detected within a preselected time period, again, for example, 15 seconds, the method proceeds to step 520 where it exits the training mode by closing the switch 216 to reconnect the voice activated dialer 102 and the handset 108 to the base 106. Having exited the training mode, the voice activated dialer 104 would return to step 402 (FIG. 4) and await detection of either the handset going off-hook or the selection of one of the control keys 300 through 314. Rather than immediately exiting the training mode upon failure to detect a second audibilization, in an alternate embodiment thereof, the method may instead return to step 510 where the second is prompt repeated. In various aspects of this alternate embodiment, the method may either return to step 510 after each failure to detect a second audibilization or may proceed to step 520 and exit the training mode after generating the second prompt a preselected number of times, for example, three, and failing to detect a second audibilization within fifteen seconds or other preselected time period thereafter.

Returning to step 514, upon detecting a second audibilization spoken by the user into the microphone 218, converted into an electrical signal thereby and propagated along the transmission lines 124 and 202, the method proceeds to step 514 where the VR/VTG circuit 204 converts the second detected signal into a second digital signal and stores the second converted digitization of the signal in the buffer memory. Next, using the data maintained in a fourth entry in the prompt table 210, the VR/VTG circuit 204 generates a third (or "enter new number") audible prompt, again in the form of an electrical signal, for placement on the line 212. From the line 212, the third electrical signal propagates to the speaker 200 via the transmission lines 202 and 124. From this signal, the speaker 200 generates a third audible message which, unlike the first and second audible messages, requests that the user enter the telephone number to be associated with the name previously spoken at both steps 508 and 512. As before, it is contemplated that any audible message which adequately conveys this instruction to the user shall be suitable for use as the third audible prompt. Here, for example, the audible message may simply be the phrase "using the keypad, enter the telephone number for that person." If desired, the VR/VTG circuit 204 may enhance the clarity of this message by appending the name stored in the buffer memory to the third audible prompt and generating an electrical signal which combines the two.

After generating the third audible prompt, the method proceeds to step 516 where the VR/VTG circuit 204 awaits input data comprised of a series of audible tones generated by the user by depressing various ones of the keys 138 of the data keypad 134 in a selected sequence. If a sequence of at least one audible tone is not detected by the VR/VTG circuit 204 in a preselected time period, for example, 15 seconds, the method proceeds to step 520 where it exits the training mode by closing the switch 216 to reconnect the voice activated dialer 102 and the handset 108 to the base 106. Having exited the training mode, the voice activated dialer 104 would then return to step 402 (FIG. 4) and await detection of either the handset going off-hook or the selection of one of the control keys 300 through 314. Rather than immediately exiting the training mode upon failure to detect a sequence of audible tones, in an alternate embodiment thereof, the method may instead return to step 514 for a next generation of the third audible prompt. In various aspects of this alternate embodiment, the method may either return to step 514 after each failure to detect a sequence of audible tones or may proceed to step 520 and exit the training mode after generating the third prompt a preselected number of times, for example, three, and failing to detect a sequence of audible tones within fifteen seconds or other preselected time period thereafter.

Returning now to step 516, upon receiving input data as a series of inputs generated by depressing selected keys 138 of the data key pad 134, the method proceeds to step 518 where a new entry for the telephone table 210 is produced from the detected audibilizations and received input data. To construct the new entry, the VR/VTG circuit 204 will first reserve a portion of the available space within the storage facility 206 for the new entry of the telephone table 210. Of course, while, in the embodiment disclosed herein, the VR/VTG circuit 204 waits until all of the data necessary to construct a new entry is received before reserving space in the storage facility 206, it is contemplated that the VR/VTG circuit 204 may instead reserve space at other times, for example, when the voice activated dialer 102 enters the training mode, for later use when the requested data is received. It is noted, however, if space is reserved before data acquisition is complete, it may be necessary for the VR/VTG circuit 204 to release the reserved space if the voice activated dialer 102 exits the training mode without completing construction of the new entry. While it is not necessary for the newly reserved space to be physically contiguous with any preexisting entries forming part of the telephone directory table 210, preferably, the newly reserved space should be linked or otherwise ordered relative to the other entries so that, when the VR/VTG circuit 204 later performs an access of the telephone directory 210, the contents of each entry may be retrieved in a sequential order. For example, the telephone directory 210 of the storage facility 206 may be a series of register files accessible by the VR/VTG circuit 204 using a top-of-stack (or "TOS") algorithm in which the contents of a uppermost register is read and then placed at the bottom of the stack while the contents of the other registers are moved up one position.

After reserving space for the new entry, the digitized electrical signal which describes the detected audibilization is placed in a first data block of the entry being constructed while the sequence of digits input using the data keys 138 is place in a second data block thereof. In the embodiment disclosed herein, the first and second audibilizations are detected by the VR/VTG circuit 204. In this embodiment, the VR/VTG circuit 204 averages the two detected audibilizations together and then stores the average of the two in the first data block of the newly added entry. Averaging of the first and second detected audibilizations is used to reduce the likelihood that the VR/VTG circuit 204 will later fail to recognize the audibilization due to a variation in the user's voice. To further enhance accuracy of the voice activated dialer 102, it may also be desirable to compare the first and second detected audibilizations and reject the audibilization if the second detected audibilization fails to match, within a preselected threshold value, the first detected audibilization. By adding this matching step, the method may avoid erroneous settings of the voice activated dialer 102 which could potentially result from an unusually large variation in the user's voice occurring during one of the first and second audibilizations detected thereby and/or by the voice activated dialer 102 inadvertently interpreting an extraneous sound as being one of the first and second audibilizations. Of course, one or both of these steps may be omitted without departing significantly from the methods disclosed herein.

After placing the entry in the telephone directory table 210, the method continues on to step 520 where it exits the training mode by issuing an instruction, via the line 214, to the switch 216 to reconnect the voice activated dialer 102 and the handset 108 to the base 104 by closing the switch 216. Having exited the training mode at step 520, the method ends at step 522. In accordance with the disclosed method, the user will need to select the first control button 300 each time that the user desires to add a new entry to the telephone directory 210. However, rather than exiting the training mode after producing each new entry, in an alternate embodiment thereof, the disclosed method will stay in the training mode until an instruction to exit is received from the user. By doing so, the user will be able to add plural new entries without selecting the first control key 300 prior to adding each new entry. For example, after adding a new entry to the telephone directory table 210, the VR/VTG circuit 204 may generate an additional prompt which provides the user with a choice of either audibilizing the next name to be added to the telephone directory table 210 or exiting the training mode by audibilizing a recognizable command, for example, the word "exit."

A method for editing an existing entry, for example, the entry 210-2, will now be described in greater detail with reference to FIG. 6. The method commences at step 600 and, at step 602, the user switches the voice activated dialer 102 into edit mode by selecting the third control button 304. Continuing on to step 604, upon detection of user selection of the third control button 304, the VR/VTG circuit 204 isolates the voice activated dialer 102 and the handset 108 from the base 106 by issuing an instruction on the line 214 to open the switch 216. Upon isolating the voice activated dialer 102 and the handset 108, the method proceeds to step 606 where the VR/VTG 204 points to a selected one of the entries 210-1 through 210-N in the telephone directory table 210 to be accessed thereby. While it is fully contemplated that any one of the entries 210-1 through 210-N in the stack of entries is suitable as the entry to be initially pointed thereto, in one embodiment thereof, the VR/VTG circuit 204 is configured to point to an uppermost entry 210-1 of the entries 210-1 through 210-N, which, in the embodiment of the invention set forth herein, would be the chronologically oldest entry maintained in the telephone directory table 210 and which, in the absence of any additional information, would be the most likely one of the entries 210-1 through 210-N to require editing.

Proceeding on to step 608, the VR/VTG circuit 204 generates an audibilization of the name stored in the entry 210-1 pointed to thereby. To do so, the VR/VTG circuit 204 accesses the first data block 210-1a of the entry 210-1 in the manner previously described and, using the information contained in the accessed portion thereof, the VR/VTG circuit 204 generates an electrical signal which, when propagated to the speaker 200 via the transmission lines 212, 202 and 124, produces an audibilization of the name stored therein.

After generating an audibilization, of the name stored in the first portion 210-1a of the entry 210-1, the method continues on to step 610 to await detection of a control input selected by the user in response to hearing the name audibilized by the voice activated dialer 102. If no control input is detected within a preselected time period, for example, seconds, after audibilization of the name contained in the data block 210-1a is completed, the method proceeds to step 612 where the VR/VTG circuit 204 determines if one of the entries 210-1 through 210-N in the telephone directory table 210 has been modified. If no entry 210-1 through 210-N in the telephone directory table 210 has been modified, the method continues on to step 646.

In the embodiment of the invention disclosed herein, and as is more fully described below, modification of an entry may be comprised of either: (1) modifying the name maintained in the first data block of a selected one of the entries maintained in the telephone directory table 210; (2) modifying the number maintained in the second data block of a selected one of the entries maintained in the telephone directory table 210; or (3) deleting a selected one of the entries maintained in the telephone directory table 210 in its entirety. Of course, it is fully contemplated that the voice activated dialer 102 may be configured to include other techniques by which the entries maintained in the telephone directory table 210 may be modified.

Returning to step 612, if the VR/VTG circuit 204 determines that one of the entries maintained in the telephone directory table 210 has been modified, the telephone directory table 210 has been successfully edited. The VR/VTG circuit 204 would then exit the edit mode by issuing a command to close the switch 216, thereby reconnecting the base 106 to the handset 108. The method will then end at step 644. If, however, the VR/VTG circuit 204 determines at step 612 that no entry in the telephone directory table 210 has been modified, the method proceeds to step 646 where the VR/VTG circuit 204 determines if the pointer is at the bottom of the stack of entries. If the pointer is at the last entry in the stack, then each name contained in each entry 210-1 through 210-N of the telephone directory table 210 has been audibilized but the user has failed to select any of the entries for editing. Under these conditions, the VR/VTG circuit 204 concludes that the user does not desire to edit the telephone directory table 210. The VR/VTG circuit 204 would then exit the edit mode by issuing a command to close the switch 216, thereby reconnecting the base 106 to the handset 108 and, as before, the method would end at step 644.

Returning to step 646, if, however, the VR/VTG circuit 204 determines that it has not yet reached the bottom of the stack of entries, the method proceeds to step 624 where the VR/VTG circuit 204 moves the pointer to the next entry in the stack and then back to step 608 for generating an audibilization of the name contained in the first data block of the next entry in the telephone directory table 210. The method would then repeat the process until an audibilization has been generated for every entry in the telephone directory table 210 and the user fails to chooses any of the entries for editing or until the user selects one of the entries maintained in the telephone directory table 210 for editing and then successfully edits the selected entry. Thus, the edit mode disclosed herein is comprised of initiating a sequential audibilization of each entry in the telephone directory 210 until a selected entry is edited or every entry in the telephone directory 210 has been audibilized. Further, in the embodiment disclosed herein, the audibilization of each entry consists of the name contained in the first data block of each entry. In an alternate embodiment, however, the audibilization of each entry may instead be comprised of both the name contained in the first data block and the telephone number contained in the second data block.

Returning to step 610, each of the control inputs which may be detected by the VR/VTG circuit 204 during the audibilization (or a selected time period immediately thereafter) for an entry will now be described in greater detail. Of the five control inputs disclosed as being detectable at step 610, two (the forward and reverse commands) involve manipulation of the telephone directory and do not involve selection of an entry for editing while the remaining three (the modify name, modify number and delete entry commands) involve the selection of an entry and the editing thereof. Thus, only selection of one of the latter commands will result in an exiting of the edit mode. The former commands, on the other hand, are provided to assist the user in manipulating the telephone directory table 210 to locate the entry for which editing is desired.

Thus, if the user depresses the fifth control key 308 during the audibilization of an entry (or a selected time period immediately thereafter), the method proceeds to step 614 where the VR/VTG circuit 204 receives a forward command. In response to receipt of the forward command, the VR/VTG circuit 204 immediately terminates the on-going audibilization of the entry currently pointed thereto and, proceeds to step 624 where the pointer is moved to a next entry in the stack. The method then returns to step 608 where the VR/VTG circuit 204 initiates generation of an audibilization of the entry newly pointed to. Conversely, if, at step 610, the user depresses the fourth control key 306 during the audibilization of an entry (or a selected time period immediately thereafter), the method instead proceeds to step 616 where the VR/VTG circuit 204 receives a reverse command. In response to receipt of the reverse command, the VR/VTG circuit 204 immediately terminates the on-going audibilization of the entry currently pointed thereto and, proceeds to step 626 where the pointer is moved to a prior entry in the stack. The method then returns to step 608 where the VR/VTG circuit 204 initiates generation of an audibilization of the prior entry now pointed thereto.

It should be readily appreciated that proper manipulation of the fourth and fifth control keys 306 and 308 in conjunction with the on-going audibilization of an identifier (here, the name) for each entry in the telephone directory table 210 enables the user to quickly move through the telephone directory table 210 to locate the particular entry requiring editing. For example, the user may enter the edit mode by selecting the third control key 304. In response, the VR/VTG circuit 204 would generate an audibilization of the first entry in the telephone directory table 210. Upon hearing the audibilization of the first entry, and having some familiarity with the arrangement of entries in the telephone directory table 210, the user may realize that the desired entry is considerably further down in the table. The user may then depress the fifth control key 308 repeatedly, thereby issuing a series of forward commands to the VR/VTG circuit 204. As each actuation moves the pointer down one entry in the telephone directory table 210, the user can move through the telephone directory table 210 quite quickly. The user may then allow the VR/VTG circuit 204 to generate an audibilization, thereby enabling the user to determine the current position of the pointer within the telephone directory table 210. If the pointer now points to the desired entry, the user may now select one of the sixth, seventh or eighth control keys 310, 312 or 314, each of which selects the current entry in the telephone directory table 210 for editing. If the pointer is still not pointing to the desired entry, the user may continue to manipulate the pointer's location within the telephone directory table 210 or may instead chose to allow the VR/VTG circuit 204 to continue to automatically move through the telephone directory table 210.

Returning to step 610, if the user selects the sixth control key 310 while the VR/VTG circuit 204 is generating an audibilization of an entry in the telephone directory table 210 (or within a preselected time period immediately thereafter), the method proceeds to step 618 where editing of the first data block of the selected entry is commenced. By editing the first data block, a new name will be associated with an existing telephone number maintained in the telephone directory table 210. Steps 628, 630, 632, 634 and 636 describes the method by which a new name is added to the telephone directory table 210. As this method is preferably the same as that described with respect to steps 404, 404 and 414 of FIG. 4, further description of this process is not deemed necessary.

Again returning to step 610, if the user selects the seventh control key 312 while the VR/VTG circuit 204 is generating an audibilization of an entry in the telephone directory table 210 (or within a preselected time period immediately thereafter), the method proceeds to step 620 where editing of the second data block of the selected entry is commenced. By editing the second data block, a new telephone number will be associated with an existing name maintained in the telephone directory table 210. Steps 638, 640 and 642 describes the method by which a new telephone number is added to the telephone directory table 210. As this method is preferably the same as that described with respect to step 416 of FIG. 4, as before, further description of this process is not deemed necessary.

Returning, a last time, to step 610, if the user selects the eighth control key 314 while the VR/VTG circuit 204 is generating an audibilization of an entry in the telephone directory table 210 (or within a preselected time period immediately thereafter), the method proceeds to step 622 where editing the selected entry is commenced with receipt, by the VR/VTG circuit 204, of a delete entry command. Proceeding on to step 644, the VR/VTG circuit 204 will first delete the entire entry pointed thereto and will then re-order the telephone directory stack by moving all of the entries beneath the deleted entry up one position. The method will then return to step 610 for further processing.

Although an illustrative embodiment of the invention has been shown and described, other modifications, changes, and substitutions are intended in the foregoing disclosure. Accordingly, it is appropriate that the appended claims be construed broadly and in a manner consistent with the scope of the invention.

What is claimed is:

1. A telephone system, comprising:
    a base having telephone circuitry;
    a telephone handset having sound detection/generation (SD/G) circuitry;
    a transmission line having first and second ends, said first end of said transmission line coupled to said telephone circuitry of said base and said second end of said transmission line coupled to said SD/G circuitry of said telephone handset;
    a voice recognition/voice tone generation (VR/VTG) circuit coupled to said transmission line at a location intermediate to said first and second ends, said VR/VTG circuit detecting an audio signal originated at said SD/G circuitry and propagated along said transmission line and generating, in response thereto, a series of tones for propagation along said transmission line, said telephone circuitry within said base establishing a call in response to said series of tones;
    a first housing, said VR/VTG circuit located entirely within said first housing;
    first and second connector plugs supportably mounted to said first housing;
    said base further comprising a second housing, said telephone circuitry located entirely within said second housing;
    a third connector plug supportably mounted to said second housing, said third connector plug coupled to said telephone circuitry;
    a third housing, said SD/G circuitry located entirely within said third housing; and
    a fourth connector plug supportably mounted to said third housing, said fourth connector plug coupled to said SD/G circuitry;
    a storage facility coupled to said VR/VTG circuit, said storage facility located entirely within said first housing;
    said storage facility maintaining a plurality of entries therein, each one of said plurality of entries comprised of first and second data blocks, said second data block defining a first series of tones capable of causing said telephone circuitry within said base to establish a call to a first destination terminal and said first data block defining an audible identifier of said first destination terminal;
    said VR/VTG circuit generating said series of tones defined by said second data block upon detecting a first audio signal, originated at said SD/G circuitry matching said audible identifier defined in said first data block;
    said transmission line further comprising a first link extending from said telephone circuitry to said first connector plug, a second link extending from said first connector plug to said second connector plug, said second link located entirely within said first housing and coupled to said VR/VTG circuit, and a third link extending from said second connector plug to said SD/G circuitry;
    wherein a first end of said first link is coupled to said third connector plug, a second end of said first link is coupled to said first connector plug, a first end of said third link is coupled to said second connector plug and a second end of said third link is coupled to said fourth connector plug; and
    wherein said VR/VTG circuit further comprises:
        means for detecting a dial tone on said second link of said transmission line;
        means for generating a first electrical signal in response to detection of a dial tone on said second link of said transmission line, said first electrical signal convertible into audible sound by said SD/G circuitry of said telephone handset;
        means for detecting a second electrical signal on said second link of said transmission line, said second electrical signal generated by said SD/G circuitry in response to detection of an audible sound thereby; and
        means for convening said second electrical signal into said series of tones used by said telephone circuitry to establish a connection.

2. The telephone system of claim 1 and further comprising:
    a data keypad formed along said first housing, said data keypad comprising at least one key coupled to said VR/VTG circuit;
    wherein said second data block of each one of said plurality of entries maintained by said storage facility is entered thereinto via said data keypad.

3. The telephone system of claim 2 and further comprising:
    a control keypad formed along said first housing, said control keypad comprising at least one key coupled to said VR/VTG circuit;

said first and second data blocks of each one of said plurality of entries maintained by said storage facility being modifiable by said VR/VTG circuit in response to instructions issued to said VR/VTG circuit by said control keypad.

4. A voice activated dialer comprising:
means for maintaining a plurality of entries in a memory subsystem, ceach one of said plurality of entries comprised of a first data block which contains an audible identifier and a second data block which contains a tone sequence associated with said audible identifier;
means for detecting a dial tone;
means for generating a prompt in response to said detecting means detecting a dial tone;
means for detecting an audibilization uttered by a user in response to said prompt;
means for comparing said detected audibilization to said audible identifiers stored in said memory subsystem;
means for generating, from a tone sequence associated with an audible identifier which matches said detected audibilization, a series of tones capable of causing telephone circuitry of establishing a call;
connection circuitry for interconnecting said voice activated dialer between a base portion and a handset portion of a telephone;
said connection circuitry further comprising:
  a first connection interface for coupling said voice activated dialer to said base portion of said telephone;
  a second connection interface for coupling said voice activated dialer to said handset portion of said telephone;
  a transmission line coupling said first connection interface and said second connection interface;
a normally closed switch provided on said transmission line and movable between closed and open positions;
wherein, in said closed position, said base portion of said telephone is coupled to said voice activated dialer and to said handset portion of said telephone via said transmission line and, in said open position, said base portion of said telephone is isolated from said voice activated dialer and from said handset portion of said telephone and said voice activated dialer remains coupled to said handset portion of said telephone.

5. The voice activated dialer of claim 4 and further comprising:
means for selectively opening and closing said normally closed switch.

6. The voice activated dialer of claim 5 and further comprising:
an interface for issuing instructions initiating modification of a selected one of said plurality of entries.

7. The voice activated dialer of claim 6 and further comprising:
means for opening said normally closed switch in response to receipt, from said interface, of an instruction initiating modification of a selected one of said plurality of entries.

8. The voice activated dialer of claim 7 wherein said interface further comprises:
means for issuing a first instruction initiating modification of a first data block of said selected one of said plurality of entries; and
means for issuing a second instruction initiating modification of a second data block of said selected one of said plurality of entries.

9. The telephone system of claim 1 wherein said VR/VTG circuit further comprises means for deactivating said VR/VTG circuit in response to detection of base tones by said telephone circuitry.

10. A telephone system, comprising:
a base having telephone circuitry;
a telephone handset having sound detection/generation (SD/G) circuitry;
a first transmission line having first and second ends, said first end of said transmission line coupled to said telephone circuitry of said base and said second end of said first transmission line coupled to a voice recognition/voice tone generation ("VR/VTG") circuit;
a second transmission line having first and second ends, said first end of said second transmission line coupled to said VR/VTG circuit and said second end of said second transmission line coupled to said SD/G circuitry of said telephone handset;
said VR/VTG circuit detecting an audio signal originated at said SD/G circuitry and propagated along said second transmission line and generating, in response thereto, a series of tones for propagation along said first transmission line, said telephone circuitry within said base establishing a call in response to said series of tones; and
normally closed switching means switchable between closed and open states;
wherein, in said closed state, said base portion of said telephone is coupled to said VR/VTG circuit and to said handset portion of said telephone and, in said open state, said base portion of said telephone is isolated from said VR/VTG circuit and from said handset portion of said telephone and said VR/VTG circuit remains coupled to said handset portion of said telephone.

11. The telephone system of claim 10 wherein said VR/VTG circuit further comprises means for deactivating said VR/VTG circuit in response to detection of base tones by said telephone circuitry.

12. The telephone system of claim 11 and further comprising:
a storage facility coupled to said VR/VTG circuit, said storage facility maintaining a plurality of entries therein, each one of said plurality of entries comprised of first and second data blocks, said second data block defining a first series of tones capable of causing said telephone circuitry within said base to establish a call to a destination terminal and said first data block defining an audible identifier of said destination terminal.

13. A telephone system, comprising:
a base having telephone circuitry;
a telephone handset having sound detection/generation (SD/G) circuitry;
a voice activated dialer housing having first and second connector plugs;
a first transmission line coupling said SD/G circuitry of said telephone handset to said first connector plug of said voice activated dialer housing;
a second transmission line coupling said first connector plug of said voice activated dialer housing to said second connector plug of said voice activated dialer housing, said second transmission line located entirely within the interior of said voice activated dialer housing;

a voice recognition/voice tone generation (VR/VTG) circuit, said VR/VTG circuit located entirely within said voice activated dialer housing;

a bi-directional line coupling said VR/VTG circuit to said second transmission line at a first location between said first connector plug of said voice activated dialer housing and said second connector plug of said voice activated dialer housing, said VR/VTG circuit receiving electrical signals being exchanged between said telephone circuitry of said base and said SD/G circuitry of said telephone handset over said bi-directional line; and a third transmission line coupling said second connector plug of said voice activated dialer housing to said telephone circuitry of said base;

said VR/VTG circuit detecting an audio signal originated at said SD/G circuitry and propagated along said first, second and third transmission lines and generating, in response thereto, a series of tones for propagation along said transmission line, said telephone circuitry within said base establishing a call in response to said series of tones.

14. The telephone system of claim 13 and further comprising said VR/VTG circuit detecting a dial tone propagated along said third, second and first transmission lines and generating, in response thereto, an electrical signal, said electrical signal convertible into an audible prompt by said SD/G circuitry of said telephone handset.

15. The telephone system of claim 14 and further comprising a uni-directional control line coupling said VR/VTG circuit and said second transmission line at a second location between said first connector plug of said voice activated dialer housing and said second connector plug of said voice activated dialer housing, said VR/VTG circuit using said uni-directional control line to selectively isolate said telephone circuitry within said base from the remainder of said telephone system.

16. A telephone system, comprising:

a base having telephone circuitry;

a telephone handset having sound detection/generation ("SD/G") circuitry;

a first transmission line having first and second ends, said first end of said first transmission line coupled to said telephone circuitry of said base and said second end of said first transmission line coupled to a voice recognition/voice tone generation "VR/VTG") circuit; and a second transmission line having first and second ends, said first end of said second transmission line coupled to said VR/VTG circuit and said second end of said second transmission line coupled to SD/G circuitry of said telephone handset;

said VR/VTG circuit: (1) detecting a dial tone propagated along said first transmission line and generating, in response thereto, an first electrical signal, said first electrical signal convertible into an audible prompt by said SD/G circuitry of said telephone handset, and (2) detecting an audio signal originated at said SD/G circuitry and propagated along said second transmission line and generating, in response thereto, a series of tones for propagation along said first transmission line, said telephone circuitry within said base establishing a call in response to said series of tones.

17. The telephone system of claim 1 and further comprising:

a first housing, said VR/VTG circuit located entirely within said first housing;

first and second connector plugs supportably mounted to said first housing; and a third transmission line extending from said first connector plug to said second connector plug and located entirely within said housing;

wherein said VR/VTG circuit is coupled to said third transmission line.

18. The telephone system claim 17 wherein said base further comprises:

a second housing, said telephone circuitry located entirely within said second housing; and a third connector plug supportably mounted to said second housing, said third connector plug coupled to said telephone circuitry;

wherein said first end of said first transmission line is coupled to said third connector plug and said second end of said first transmission line is coupled to said first connector plug.

19. The telephone system of claim 18 wherein said handset further comprises;

a third housing, said SD/G circuitry located entirely within said third housing; and a fourth connector plug supportably mounted to said third housing, said fourth connector plug coupled to said SD/G circuitry;

wherein a first end of said third transmission line is coupled to said second connector plug and a second end of said third transmission line is coupled to said fourth connector plug.

20. The telephone system of claim 16 wherein said VR/VTG circuit further comprises:

means for detecting a dial tone on said third transmission line;

means for generating said first electrical signal in response to detection of a dial tone on said third transmission line, said first electrical signal convertible into said audible prompt by said SD/G circuitry of said telephone handset;

means for detecting a second electrical signal on said third transmission line, said second electrical signal generated by said SD/G circuitry in response to detection of an audible sound thereby; and means for converting said second electrical signal into said series of tones used by said telephone circuitry to establish a connection.

* * * * *